US011504860B2

(12) United States Patent
Hayashi et al.

(10) Patent No.: US 11,504,860 B2
(45) Date of Patent: Nov. 22, 2022

(54) CHARACTERISTIC ESTIMATION SYSTEM, CHARACTERISTIC ESTIMATION METHOD, AND INFORMATION STORAGE MEDIUM

(71) Applicant: Kabushiki Kaisha Yaskawa Denki, Kitakyushu (JP)

(72) Inventors: Terumitsu Hayashi, Kitakyushu (JP); Takeomi Hidaka, Kitakyushu (JP); Tetsuya Yamasaki, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 201 days.

(21) Appl. No.: 16/695,210

(22) Filed: Nov. 26, 2019

(65) Prior Publication Data

US 2020/0171675 A1 Jun. 4, 2020

(30) Foreign Application Priority Data

Nov. 29, 2018 (JP) ............................ JP2018-223491

(51) Int. Cl.
*B25J 13/08* (2006.01)
*B25J 9/16* (2006.01)

(52) U.S. Cl.
CPC ........... *B25J 13/087* (2013.01); *B25J 9/1612* (2013.01); *B25J 13/081* (2013.01); *B25J 13/085* (2013.01)

(58) Field of Classification Search
CPC ...... B25J 13/087; B25J 13/081; B25J 13/085; B25J 9/1612; B25J 9/1633; G05B 19/41815; G05B 19/4183; G05B 2219/39529
USPC ....................... 700/258, 261; 73/763; 901/27
See application file for complete search history.

(56) References Cited

U.S. PATENT DOCUMENTS

2010/0087955 A1 4/2010 Tsusaka et al.
2014/0214209 A1 7/2014 Sugiura et al.
2014/0365009 A1* 12/2014 Wettels .................... B25J 15/00 700/258
2015/0285721 A1 10/2015 Watanabe et al.
2016/0016311 A1* 1/2016 Konolige ............. B25J 15/0616 700/245
2016/0238659 A1 8/2016 Shiromoto et al.
(Continued)

FOREIGN PATENT DOCUMENTS

CN 101646534 A 2/2010
JP H0697259 A 4/1994
(Continued)

OTHER PUBLICATIONS

Taisuke Sugaiwa et al. "A methodology for Setting Grasping Force for Picking up an Object with Unkown Weight, Friction, and Stiffness", Humanoid Robots (Humanoids), 2010 10th IEEE-RAS International Conference on, IEEE, Piscataway, NJ, USA, Dec. 6, 2010, pp. 288-293.
Ryo Takano et al. "Real-time Shape Estimation of Kirchhoff Elastic Rod Based on Force/Torque Sensor", 2017 IEEE International Conference on Robotics and Automation (ICRA), IEEE, May 29, 2017, pp. 2508-2515.
(Continued)

*Primary Examiner* — Dalena Tran
(74) *Attorney, Agent, or Firm* — HEA Law PLLC

(57) ABSTRACT

A characteristic estimation system, comprising circuitry configured to, cause a robot hand configured to grip an object to operate based on operation information defining an operation of the robot hand, acquire a physical quantity at a time when the robot hand grips the object, and estimate a characteristic of the object based on the physical quantity.

16 Claims, 10 Drawing Sheets

(56) References Cited

U.S. PATENT DOCUMENTS

| | | | | |
|---|---|---|---|---|
| 2016/0288326 | A1 | 10/2016 | Furuya | |
| 2017/0259433 | A1 | 9/2017 | Takeuchi et al. | |
| 2017/0282363 | A1* | 10/2017 | Yamada | B25J 9/1612 |
| 2018/0368931 | A1 | 12/2018 | Hongo et al. | |
| 2019/0263001 | A1 | 8/2019 | Koike et al. | |

FOREIGN PATENT DOCUMENTS

| | | | |
|---|---|---|---|
| JP | 2013096870 | A | 5/2013 |
| JP | 5327722 | B2 | 10/2013 |
| JP | 2015196187 | A | 11/2015 |
| JP | 2016193463 | A | 11/2016 |
| WO | 2015/068210 | A1 | 5/2015 |
| WO | 2017130562 | A1 | 8/2017 |
| WO | 2017175526 | A1 | 10/2017 |
| WO | 2018092254 | A1 | 5/2018 |

OTHER PUBLICATIONS

Hanafiah Yussof et al. "Low Force Control Scheme for Object Hardness Distinction in Robot Manipulation Based on Tactile Sensing", 2013 IEEE International Conference on Robotics and Automation (ICRA), May 6-10, 2013, Karlsruhe, Germany, May 1, 2008, pp. 3443-3448.

The Search Report of May 18, 2020, for corresponding EP Patent Application No. 19211189.6.

Office Action of Jun. 23, 2020, for corresponding JP Patent Application No. 2018-223491 with partial English translation.

Office Action dated Dec. 2, 2021, for corresponding EP Patent Application No. 19211189.6 pp. 1-8.

Office Action dated Nov. 30, 2021, for corresponding JP Patent Application No. 2018-223491 with partial English translation pp. 1-9.

* cited by examiner

| ACQUISITION DATE AND TIME | PHYSICAL QUANTITY | | |
|---|---|---|---|
| | TORQUE SIGNAL | FORCE SIGNAL | ENCODER SIGNAL |
| 2018/10/26 10:00:00 | TORQUE SIGNAL 1 | FORCE SIGNAL 1 | ENCODER SIGNAL 1 |
| 2018/10/26 10:00:20 | TORQUE SIGNAL 2 | FORCE SIGNAL 2 | ENCODER SIGNAL 2 |
| 2018/10/26 10:00:40 | TORQUE SIGNAL 3 | FORCE SIGNAL 3 | ENCODER SIGNAL 3 |
| . . . | . . . | . . . | . . . |

CHARACTERISTIC ESTIMATION SYSTEM, CHARACTERISTIC ESTIMATION METHOD, AND INFORMATION STORAGE MEDIUM

CROSS-REFERENCE TO RELATED APPLICATION

The present disclosure contains subject matter related to that disclosed in Japanese Patent Application JP2018-223491 filed in the Japan Patent Office on Nov. 29, 2018 the entire contents of which are hereby incorporated by reference.

BACKGROUND OF THE INVENTION

Field of the Invention

The present invention relates to a characteristic estimation system, a characteristic estimation method, and an information storage medium.

SUMMARY OF THE INVENTION

A characteristic estimation system according to one aspect of the present invention includes circuitry configured to: cause a robot hand configured to grip an object to operate based on operation information defining an operation of the robot hand; acquire a physical quantity at a time when the robot hand grips the object; and estimate a characteristic of the object based on the physical quantity.

BRIEF DESCRIPTION OF THE DRAWINGS

FIG. 4 is a table for showing a data storage example of a database.

DESCRIPTION OF THE EMBODIMENTS

1. Overall Configuration of Characteristic Estimation System

From a viewpoint of the inventor of the present invention, when a product is manufactured in a factory or the like, for example, it may take time and effort to inspect the product. In a case where the object is gripped by a robot hand, when characteristics such as a size, a shape, and hardness can be estimated, it is possible to reduce the time and effort required for the inspection and to improve the quality of the inspection. As a result of extensive research and development for estimating the characteristics of an object, the inventor of the present invention has conceived a novel and original characteristic estimation system and the like. A detailed description is now given of the characteristic estimation system and the like according to an embodiment of the present invention.

Figure 1:
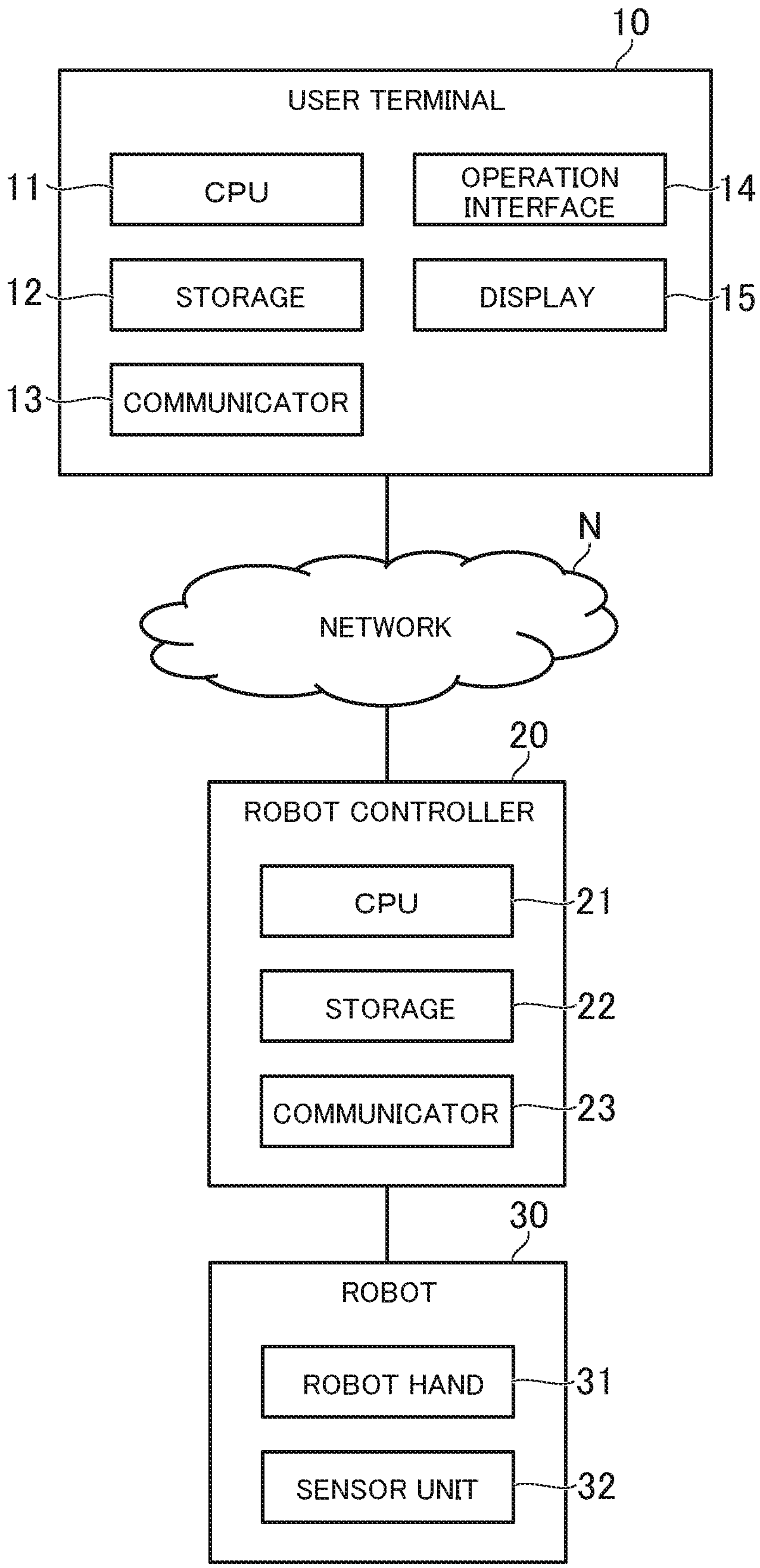
FIG. 1 is a diagram for illustrating an overall configuration of a characteristic estimation system according to an embodiment of the present invention.

FIG. 1 is a diagram for illustrating an overall configuration of the characteristic estimation system according to the embodiment. As illustrated in FIG. 1, a characteristic estimation system 1 includes a user terminal 10, a robot controller 20, and a robot 30. Each of the user terminal 10 and the robot controller 20 is connected to a network N such as the Internet or a local area network. In FIG. 1, one user terminal 10, one robot controller 20, and one robot 30 are illustrated, but there may be a plurality of user terminals 10, robot controllers 20, and robots 30.

The user terminal 10 is a computer to be operated by a user. For example, the user terminal 10 is a personal computer, a cellular phone (including a smartphone), or a mobile terminal (including a tablet terminal). The user terminal 10 includes a CPU 11, a storage 12, a communicator 13, an operation interface 14, and a display 15.

The CPU 11 includes at least one processor. The storage 12 includes a volatile memory, for example, a RAM and a non-volatile memory, for example, a hard disk, and is configured to store various programs and data. The CPU 11 is configured to execute various types of processing based on those programs and data. The communicator 13 includes a network card and a communication interface, for example, various types of communication connectors, and is configured to communicate to/from other devices. The operation interface 14 is an input device such as a mouse and a keyboard. The display 15 is a liquid crystal display, an organic EL display, or the like, and is configured to display various types of screens in accordance with an instruction from the CPU 11.

The robot controller 20 is a computer configured to control the robot 30. The robot controller 20 may be a dedicated device for a specific robot 30, but is a general-purpose computer in this embodiment. The robot controller 20 includes a CPU 21, a storage 22, and a communicator 23. The CPU 21, the storage 22, and the communicator 23 have the same configuration as the CPU 11, the storage 12, and the communicator 13, respectively. The robot controller 20 is configured to transmit an operation instruction to the robot 30. The robot controller 20 may be configured to control a plurality of robots 30.

The robot 30 is, for example, an industrial robot. The robot 30 may be a general-purpose articulated robot. For example, various types of robots such as a vertical articulated robot, a horizontal articulated robot, and a gantry robot can be applied. There may be any number of arms of the robot 30. There may be only one arm or a plurality of arms. The robot 30 includes a robot hand 31 and a sensor unit 32.

The robot hand 31 is also referred to as a “work hand” or an “end effector”. The robot hand 31 is attached to a tip of the robot arm of the robot 30, and is configured to grip and move an object to a predetermined position. Power required for the operation of the robot hand 31 is supplied by a power line passing through the inside of the robot 30. A motor in the robot hand 31 is rotated by the power supplied from the power line to control the opening and closing of the robot hand 31. When the motor rotates in a predetermined direction, a fingertip of the robot hand 31 moves in a closing direction, and when the motor rotates in the reverse direction, the fingertip of the robot hand 31 moves in the closing direction. The motor is not limited to a rotary type, and may be a linear type.

The sensor unit 32 includes a sensor configured to detect operation of the robot 30. In this embodiment, there is described a case in which the sensor unit 32 is configured to detect operation of the robot hand 31, but the sensor unit 32 may be configured to detect operation of the robot arm of the robot 30. For example, the sensor unit 32 includes at least one of a torque sensor, a force sensor, or a motor encoder. The torque sensor is a sensor configured to detect a torque when the motor inside the robot hand 31 rotates. As the torque sensor, any system can be applied, such as a capacitance system or an optical system. The force sensor is a sensor configured to detect a force applied to the tip of the robot hand 31. The force sensor is also referred to as a "force-sensing sensor" or a "tactile sensor", and any system can be applied, such as a strain gauge system or a capacitance system. The motor encoder is a sensor configured to detect a position of the motor in the robot hand 31. For example, when the motor is a rotary motor, the rotation amount (rotation position/rotation angle) is detected. When the motor is a linear motor, the movement amount (current position) on a straight line is detected. As the motor encoder, any system can be applied, such as an optical system or a magnetic system.

The programs and data described as being stored in the storage 12 and the storage 22 may be supplied to the user terminal 10 or the robot controller 20 through the network N. Moreover, the hardware configuration of each device is not limited to the above-mentioned example, and various types of hardware can be applied. For example, the user terminal 10 and the robot controller 20 may each include a reader (for example, optical disc drive or memory card slot) configured to read a computer-readable information storage medium and an input/output device (for example, USB terminal) configured to directly connect to an external device. In this case, programs and data stored in the information storage medium may be supplied to the user terminal 10 or the robot controller 20 through the reader or the input/output device.

2. Outline of Characteristic Estimation System

Figure 2:
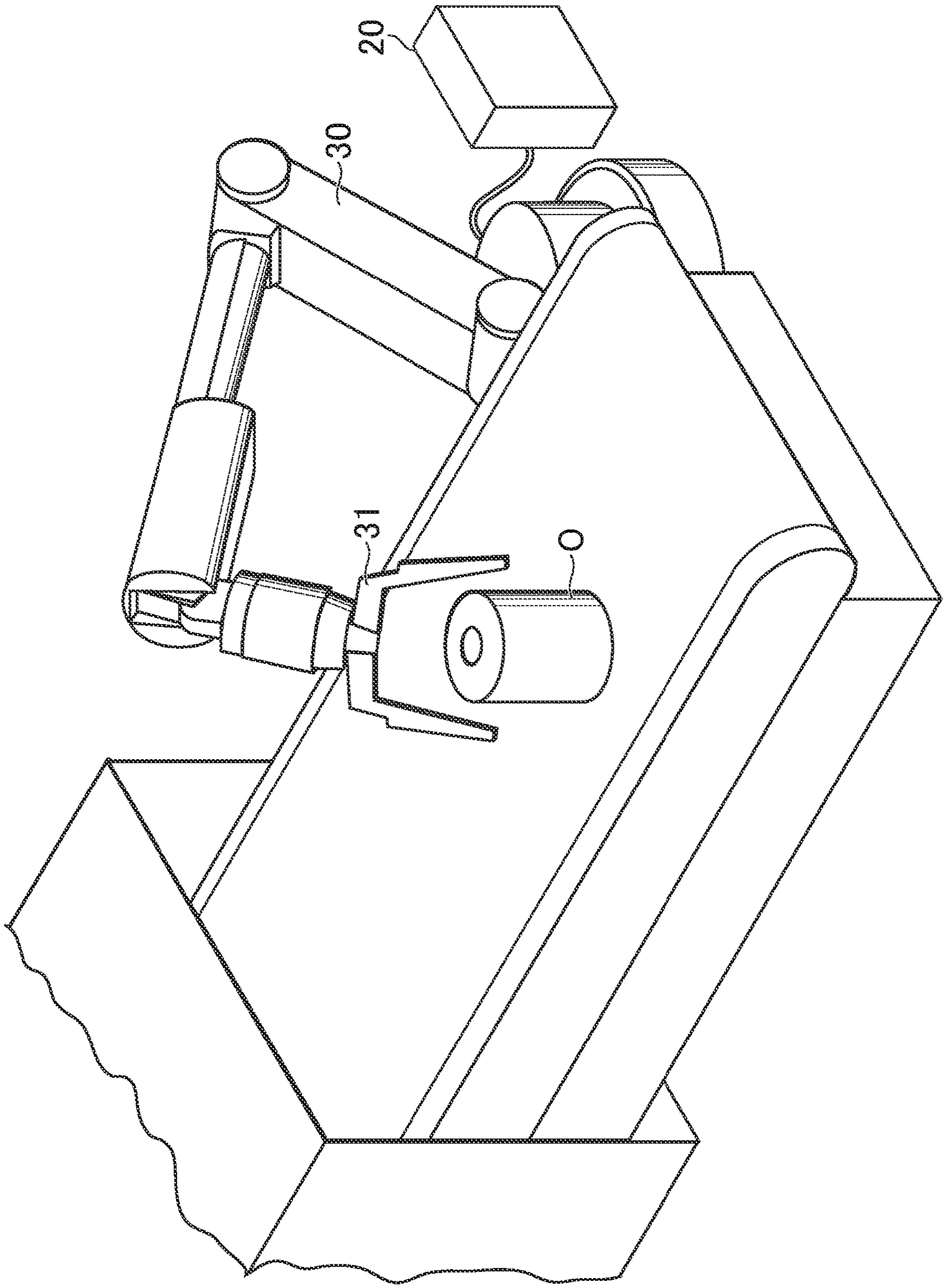
FIG. 2 is a diagram for illustrating how the characteristic estimation system is used.

FIG. 2 is a diagram for illustrating how the characteristic estimation system 1 is used. For example, the characteristic estimation system 1 is used in a facility, for example, a factory manufacturing processed food, and as illustrated in FIG. 2, the robot hand 31 grips an object O.

The object O is an object to be gripped by the robot hand 31, and is also referred to as a "workpiece". The final product may correspond to the object O, or an intermediate product produced in the manufacturing process of the product may correspond to the object O. For example, the object O is moved within a work range of the robot 30 by a belt conveyor or the like, and is gripped by the robot hand 31 operating under the control of the robot controller 20.

The characteristic estimation system 1 may be used in a situation in which any product is manufactured. In this embodiment, operation of the characteristic estimation system 1 is described based on an example in which a processed food is manufactured. The manufacturing process itself of the processed food may be a general manufacturing process, and includes, for example, a raw material production process, a molding process, and a heating process.

The raw material production process is a process of producing the raw material of the processed food. For example, in the raw material production process, seasonings and the like are added to the raw material and stirred. The molding process is a process of molding the raw material produced in the raw material production process. For example, in the molding process, the raw material is molded by extruding the raw material from a die or the like or by pouring the raw material into a mold. The heating process is a process of heating the molded raw material. For example, in the heating process, the raw material is heated by the molded raw material passing through an oven or a steamer.

In this embodiment, there is described a case in which a molded raw material that has undergone the molding process corresponds to the object O. The robot hand 31 is configured to grip the object O on which the molding process has been performed, and to estimate various characteristics such as the size, shape, or hardness of the object O based on a physical quantity detected by the torque sensor or the like of the sensor unit 32. Now, details of the configuration of the characteristic estimation system 1 are described.

3. Functions to be Implemented in Characteristic Estimation System

Figure 3:
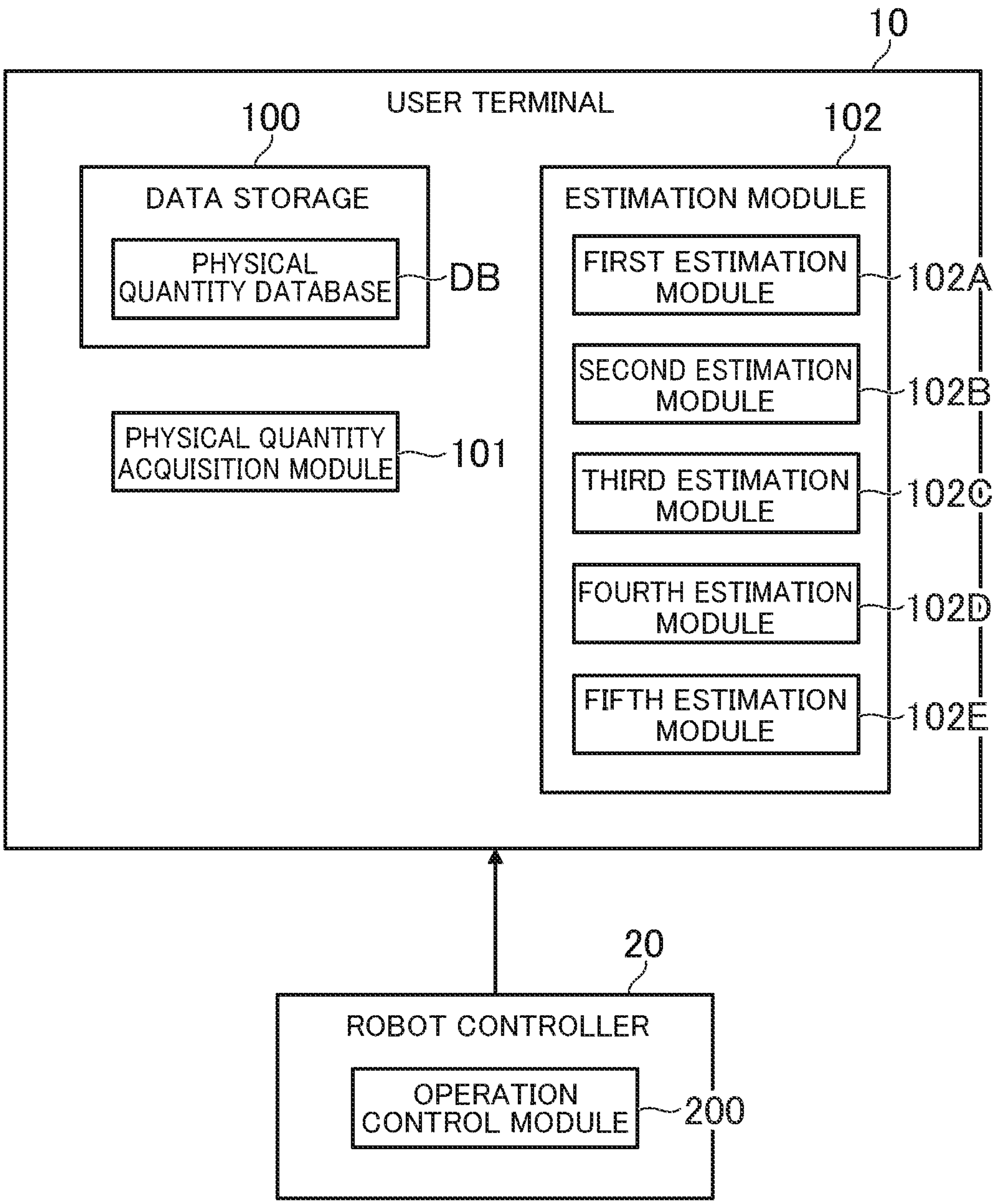
FIG. 3 is a functional block diagram for illustrating functions to be implemented in the characteristic estimation system.

FIG. 3 is a functional block diagram for illustrating functions to be implemented in the characteristic estimation system 1. The functions to be implemented by each of the user terminal 10 and the robot controller 20 are now described.

[3-1. Functions to be Implemented by Robot Controller]

As illustrated in FIG. 3, in the robot controller 20, an operation control module 200 is implemented. The operation control module 200 is mainly implemented by the CPU 21. The operation control module 200 is configured to operate the robot hand 31 based on operation information defining operation of the robot hand 31. The operation information defines the timing and force (speed) of opening and closing the robot hand 31. The operation control module 200 opens and closes the robot hand 31 based on the timing and force indicated by the operation information.

In this embodiment, the robot hand 31 grips the object O arranged at a first position and moves the object O to a second position. Therefore, the operation information indicates commands and parameters for moving the robot hand 31 to the first position, closing the hand at the predetermined timing and force, and moving the robot hand 31 to the second position while maintaining a constant grip force. Based on the commands and parameters indicated by the operation information, the operation control module 200 moves the robot hand 31 to the first position, closes the hand at the predetermined timing and force, then moves the robot hand 31 to the second position while maintaining a constant grip force, and opens the hand.

In this embodiment, the object O is manufactured in cycles, and therefore the operation information indicates operation of the robot hand 31 in each cycle. For example, the operation control module 200 operates the robot hand 31 based on the operation information when the start point of the cycle arrives. The operation control module 200 may determine whether or not the start time of the cycle has arrived by executing time measurement processing, or a sensor may be arranged to detect that the object O has moved to a predetermined position, and the operation control module 200 may determine whether or not the start point of the cycle has arrived based on a signal from the sensor.

For example, when the motor in the robot hand 31 is a rotary motor, the operation information defines the timing and rotation amount for rotating the motor. The operation control module 200 controls an output voltage to the motor such that the motor rotates at the timing and rotation amount indicated by the operation information. For example, when the motor in the robot hand 31 is a linear motor, the operation information defines the timing and movement amount for moving the motor. The operation control module 200 controls the output voltage to the motor such that the motor moves at the timing and movement amount indicated by the operation information.

In the operation information, not only operation of the robot hand 31 but also operation of the robot arm of the robot 30 may be defined. The operation control module 200 may operate the robot arm of the robot 30 such that the robot hand 31 moves to the position of the object O based on the operation information.

[3-2. Functions to be Implemented by User Terminal]

As illustrated in FIG. 3, in the user terminal 10, a data storage 100, a physical quantity acquisition module 101, and an estimation module 102 are implemented.

[Data Storage]

The data storage 100 is mainly implemented by the storage 12. The data storage 100 is configured to store the data required for estimating a characteristic of the object O. For example, the data storage 100 stores a database DB for storing physical quantities acquired by the physical quantity acquisition module 101.

FIG. 4 is a table for showing a data storage example of the database DB. As shown in FIG. 4, physical quantities acquired by the physical quantity acquisition module 101 are stored in the database DB in time series. For example, the physical quantities are stored in association with the acquisition date and time. When a plurality of types of physical quantities are acquired, information such as the type of the physical quantity (sensor type) and the name of the axis on which the physical quantity is detected may be stored in the database DB.

The physical quantity is information indicating operation of the robot hand 31 detected by the sensor unit 32. The physical quantity may be any kind of information, for example, a torque signal (torque value) detected by the torque sensor of the sensor unit 32, a force signal (pressure value) detected by the force sensor of the sensor unit 32, or an encoder signal (rotation amount or movement amount) detected by the motor encoder of the sensor unit 32.

In this embodiment, the product is manufactured in cycles, and therefore, for each cycle, the physical quantity detected for that cycle is stored in the database DB. In other words, for each object O, the physical quantity detected when the robot hand 31 grips the object O is stored in the database DB.

The data to be stored in the data storage 100 is not limited to the above-mentioned example. For example, the data storage 100 may store a threshold value and a reference value, which are described later, or may store an application for collecting and analyzing physical quantities.

[Physical Quantity Acquisition Module]

The physical quantity acquisition module 101 is mainly implemented by the CPU 11. The physical quantity acquisition module 101 is configured to acquire a physical quantity at a time when the robot hand 31 grips the object O. The physical quantity acquisition module 101 acquires the physical quantity based on a detection signal from the sensor unit 32. In this embodiment, there is described a case in which the physical quantity acquisition module 101 acquires the detection signal from the sensor unit 32 directly as the physical quantity. However, the physical quantity acquisition module 101 may also magnify or perform other processing on the value indicated by the detection signal from the sensor unit 32, and acquire the processed value as the physical quantity.

When the physical quantity is acquired, the physical quantity acquisition module 101 stores the physical quantity in the database DB in association with the acquisition time. For example, the physical quantity acquisition module 101 acquires a torque signal detected by the torque sensor of the sensor unit 32 as the physical quantity, and stores the acquired torque signal in the database DB. As another example, the physical quantity acquisition module 101 acquires a force signal detected by the force sensor of the sensor unit 32 as the physical quantity, and stores the acquired force signal in the database DB. As another example, the physical quantity acquisition module 101 acquires an encoder signal detected by the motor encoder of the sensor unit 32 as the physical quantity, and stores the acquired encoder signal in the database DB.

The physical quantity acquisition module 101 acquires the physical quantity detected in a period determined in advance (hereinafter referred to as "acquisition period"). The acquisition period may include the entire period during which the robot hand 31 is in contact with the object O, or may include only a part of the period. Specifically, the acquisition period may include all or only a part of the period from the time the robot hand 31 touches the object O in order to grip the object O until the robot hand 31 moves the object O and separates from the object O. Stated another way, the acquisition period may include all or only a part of the period from when the robot hand 31 starts the operation of closing the hand in order to grip the object O until the robot hand 31 opens and finishes releasing the object O. When a product is to be manufactured in cycles such as in this embodiment, the acquisition period may include all of the cycle or only a part of the cycle.

Figure 5:
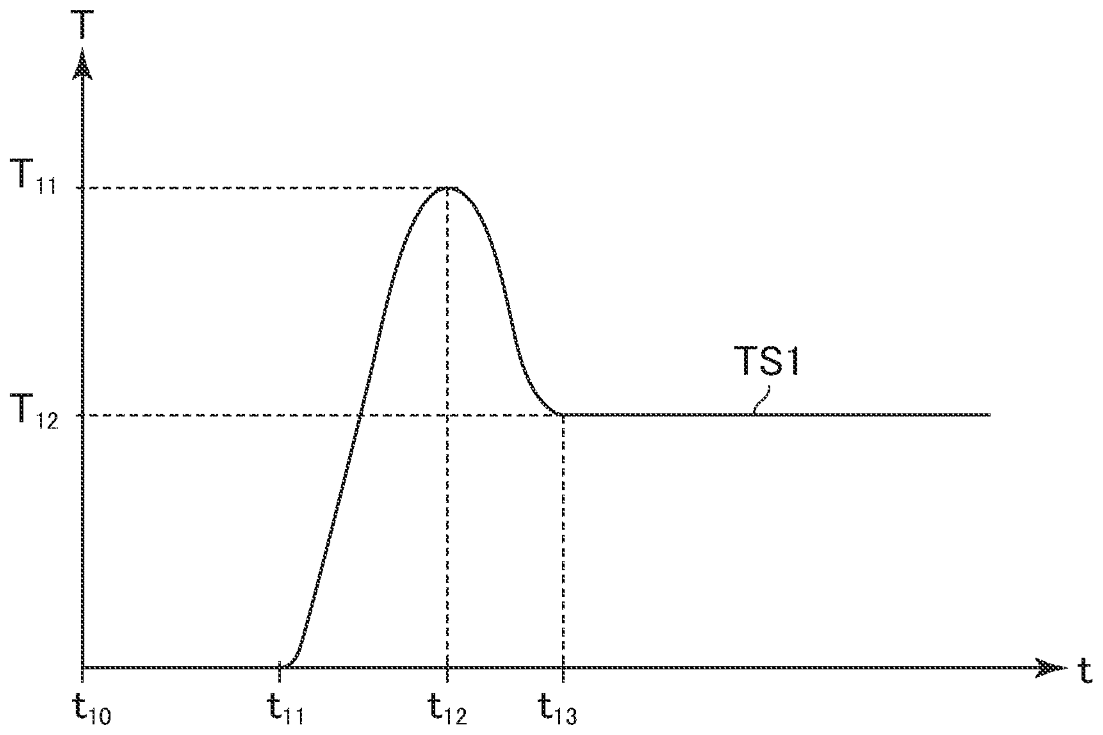
FIG. 5 is a graph for showing an example of a physical quantity acquired by a physical quantity acquisition module.

FIG. 5 is a graph for showing an example of a physical quantity acquired by the physical quantity acquisition module 101. In this case, there is described an example in which the physical quantity is a torque signal. In FIG. 5, the horizontal axis (t-axis) is a time axis, and the vertical axis (T-axis) is an axis indicating the value of the torque signal. In FIG. 5, a waveform of the torque signal is indicated by a symbol TS1. The torque signal TS1 is shown from when the robot hand 31 starts a closing operation until the grip of the object O is completed. As shown in FIG. 5, the torque signal TS1 is a constant value from when the robot hand 31 starts the closing operation until the robot hand 31 touches the object O ($t=t_{10}$ to $t_{11}$ of FIG. 5).

When the robot hand 31 touches the object O, the robot hand 31 continues the closing operation while a repelling force from the part touching the object O acts against the robot hand 31, and therefore the torque signal TS1 rises ($t=t_{11}$ of FIG. 5). The robot hand 31 continues the closing operation as it is, and after the most torque is generated and the torque signal TS1 reaches a peak value $T_{11}$ ($t=t_{12}$ of FIG. 5), the object O is in a stably gripped state, and the torque signal TS1 converges to a convergence value $T_{12}$ ($t=t_{13}$ of FIG. 5). In the following description, the reference symbols of the torque signals are omitted unless it is particularly required to refer to the drawings.

In this embodiment, the object O is manufactured in cycles, and therefore the torque signal changes over a cycle in the manner indicated by TS1 of FIG. 5. In a case in which the object O has fallen over and cannot be gripped by the robot hand 31, the robot hand 31 does not touch the object O, and therefore the torque signal is a constant value without a peak. As another example, when the robot hand 31 drops the object O during the operation or crushes and destroys the object O, the torque signal changes rapidly from the converged state.

[Estimation Module]

The estimation module 102 is mainly implemented by the CPU 11. The estimation module 102 is configured to estimate a characteristic of the object O based on a physical quantity. The characteristic of the object O is a state, a feature, or a quality of the object O. For example, the characteristic may be the size, shape, or hardness (firmness) of the object O, or whether or not an abnormality has occurred. The term "estimation" as used herein means determining the characteristic of the object O from a physical quantity.

The relationship between the physical quantity and the characteristic of the object O is described as a part of the program code. In this embodiment, a plurality of conditions relating to the physical quantity are prepared. Each condition is associated with a characteristic of the object O, and the estimation module 102 estimates the characteristic associated with the condition satisfied by the physical quantity as the characteristic of the object O. The object O to be estimated is the object O that is being gripped at the time of acquisition of the physical quantity.

There is now described an example of the conditions for estimating the characteristic of the object O. In this embodiment, the estimation module 102 includes a first estimation module 102A, a second estimation module 102B, a third estimation module 102C, a fourth estimation module 102D, and a fifth evaluation module 102E, and estimates the characteristic of the object O by comprehensively considering a plurality of conditions. The following description is an example of a method of estimating the characteristic, but it is not required that all of the first estimation module 102A to the fifth estimation module 102E be implemented. For example, only a part (any one, two, three, or four) of the first estimation module 102A to the fifth estimation module 102E may be implemented. Similar to the example of FIG. 5, there is described an example in which the physical quantity is a torque signal.

[First Estimation Module]

In this embodiment, when the object O is manufactured in cycles and an abnormality occurs in the object O in a given cycle, the gripping method of the robot hand 31 may be different from the other cycles. For this reason, the first estimation module 102A is configured to estimate the characteristic of the object O based on a change in the torque signal acquired in each manufacturing cycle of the object.

Figure 6:
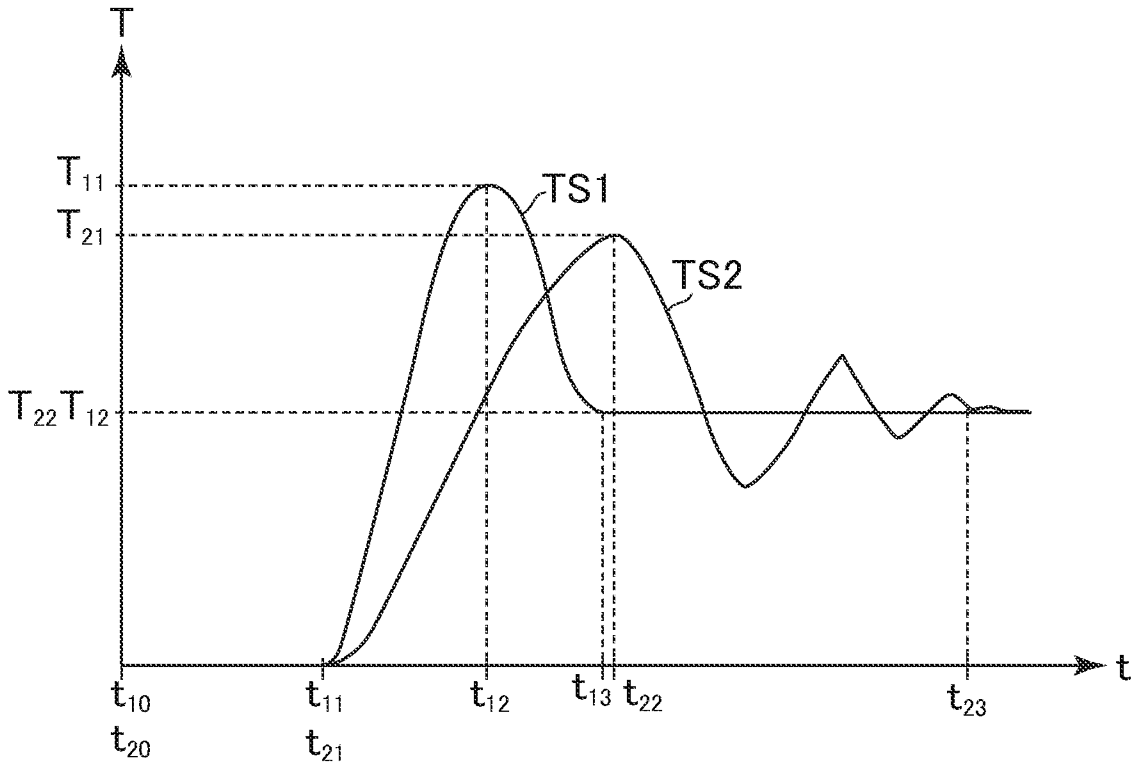
FIG. 6 is a graph for showing processing of estimating a characteristic of an object.

FIG. 6 is a graph for showing processing of estimating a characteristic of the object O. For example, the first estimation module 102A determines whether or not a difference between the torque signal in the cycle in which the object O to be estimated is manufactured (hereinafter referred to as "estimation cycle") and the torque signal at a time when the object O manufactured in another cycle (hereinafter referred to as "comparison cycle") serving as a cycle to be compared to is gripped is equal to or more than a threshold value, and estimates the characteristic of the object O based on the determination result.

The comparison cycle may be any cycle different from the estimation cycle, and may be before the estimation cycle or after the estimation cycle. It is sufficient that at least one cycle is the comparison cycle. The comparison cycle may be only one cycle or may be a plurality of cycles. When a plurality of cycles are comparison cycles, the first estimation module 102A may compare each torque signal for all of the comparison cycles with the torque signal for the estimation cycle, or may calculate an average value of the torque signals of the plurality of comparison cycles and compare that average value with the torque signal for the estimation cycle.

For example, when the difference between a torque signal TS2 in the estimation cycle and the torque signal TS1 in the comparison cycle is equal to or more than a threshold value, the first estimation module 102A estimates that an abnormality has occurred in the object O in the estimation cycle, and when the difference is less than the threshold value, the first estimation module 102A estimates that the object O of the estimation cycle is normal.

The difference is a difference between the torque signal values or a difference in timing at which the torque signals have changed. The torque signals change with time, and therefore the first estimation module 102A may acquire an integral value of the torque signal difference as the difference, or may acquire the average value of the torque signal difference as the difference. As another example, the first estimation module 102A may acquire, as the difference, the value of the difference at the time at which the difference between the torque signals is the largest. In the example of FIG. 6, the timings $t_{11}$ and $t_{21}$ at which the signal rises is the same for the torque signals TS1 and TS2, but the subsequent peak values $T_{11}$ and $T_{21}$ and the timings $t_{12}$ and $t_{22}$ are different. The convergence values $T_{12}$ and $T_{22}$ and the timings $t_{13}$ and $t_{23}$ thereof are also different. Those signal values and timings are used as the difference.

The threshold value may be a value determined in advance, and is stored in the data storage 100. The threshold value may be a fixed value or a variable value. For example, the threshold value may be specified by the user, or a value may be set depending on the type of the object O or the type of the robot 30.

An abnormality is a situation in which the characteristic of the object O is not that of a standard object O. Stated another way, an abnormality occurs when an error with respect to the characteristic of the standard object O exceeds an allowable range. For example, an abnormality occurs when at least one error of the size, shape, and hardness of the object O is equal to or more than an allowable range. The characteristic of the standard object O is a characteristic of an ideal object O, and is the characteristic of the object O expected by the user. In a process of molding a processed food as in this embodiment, molding is performed such that the processed food has a predetermined shape, and therefore having the expected size, shape, and hardness corresponds to having the characteristic of the standard object O. The object O having an unexpected characteristic corresponds to occurrence of an abnormality.

"Normal" means the opposite of abnormality, and is the characteristic of the standard object O. Stated another way, "normal" means that the error with respect to the characteristic of the standard object O is less than the allowable range. For example, when the error of at least one of the size, shape, or hardness of the object O is less than the allowable range, the characteristic is normal. The object O having an expected characteristic corresponds to being normal.

[Second Estimation Module]

The second estimation module 102B is configured to estimate the characteristic of the object O based on the rise time of the torque signal. The rise time is a timing at which the torque signal changes from a state in which the change in the torque signal is less than the threshold value before the robot hand 31 touches the object O to a state in which the robot hand 31 touches the object O and the change in the torque signal is equal to or more than the threshold value.

Stated another way, the rise time is a timing at which the torque signal changes from a state in which the amount of increase in the torque signal per unit time is less than the threshold value before the robot hand 31 touches the object O to a state in which the robot hand 31 touches the object O and the amount of increase in the torque signal per unit time is equal to or more than the threshold value. The threshold value may be set to any value, and may be a fixed value or a variable value.

For example, the second estimation module 102B determines whether or not the rise time of the torque signal is earlier than a reference value, and estimates the characteristic of the object 0 based on the determination result. The reference value may be any timing determined in advance, and for example, is the rise time of the torque signal at a time when the robot hand 31 grips the standard object O. The reference value may be set manually by the user, or may be an average value of rise times of torque signals of objects O determined to be normal. The second estimation module 102B determines whether or not the rise time of the torque signal is earlier than a standard timing.

Figure 7:
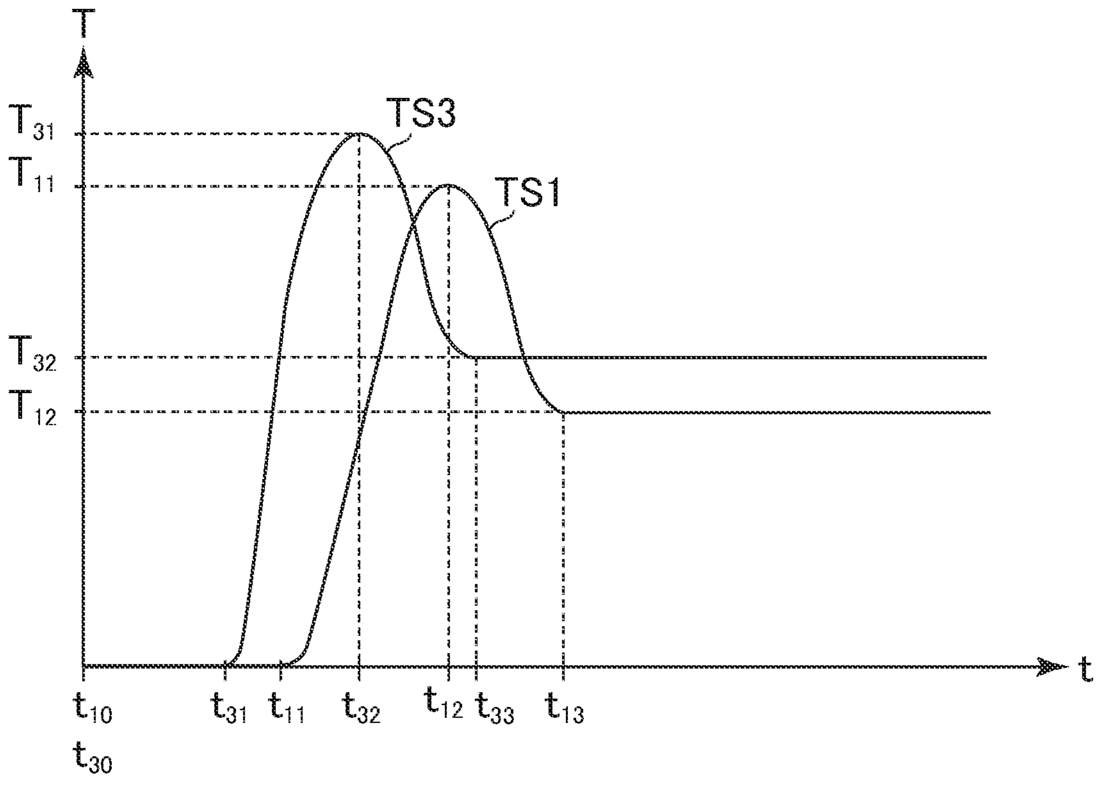
FIG. 7 is a graph for showing processing of estimating a characteristic of an object.
Figure 8:
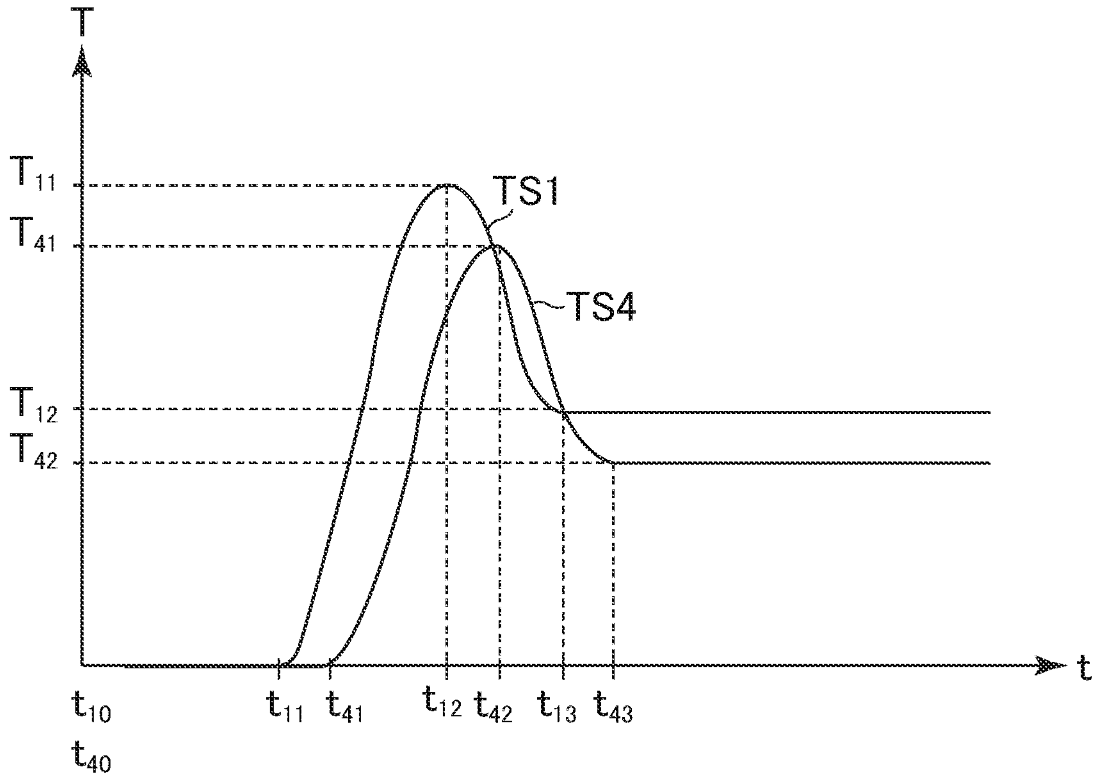
FIG. 8 is a graph for showing processing of estimating a characteristic of an object.

FIG. 7 and FIG. 8 are graphs for showing processing of estimating a characteristic of the object O. The torque signal TS1 of FIG. 7 and FIG. 8 is a torque signal of the standard object O. For this reason, the reference value is the rise time $t_{11}$ of the torque signal TS1. For example, when the object O is larger than a standard size, the robot hand 31 touches the object O earlier than expected, and hence a rise time $t_{31}$ is earlier than the torque signal TS1, as shown by a torque signal TS3 of FIG. 7. On the other hand, when the object O is smaller than the standard size, the robot hand 31 touches the object O later than expected, and hence a rise time $t_{41}$ is later than the torque signal TS1, as shown by a torque signal TS4 of FIG. 8.

For this reason, the second estimation module 102B may determine whether or not the rise time of the torque signal is earlier than the reference value, and estimate the size of the object O based on the determination result. Specifically, the second estimation module 102B may determine that the object O is larger than the standard when the rise time of the torque signal is earlier than the reference value, and determines that the object O is smaller than standard when the rise time of the torque signal is later than the reference value.

As another example, when the shape of the object O protrudes compared to a standard shape, the robot hand 31 touches the object O earlier than expected, and hence a rise time $t_{31}$ is earlier than the torque signal TS1, as shown by the torque signal TS3. On the other hand, when the object O is recessed compared to the standard size, the robot hand 31 touches the object O later than expected, and hence a rise time $t_{41}$ is later than the torque signal TS1, as shown by the torque signal TS4.

For this reason, the second estimation module 102B may determine whether or not the rise time of the torque signal is earlier than the reference value, and estimate the shape (degree of recess/protrusion) of the object O based on the determination result. Specifically, the second estimation module 102B may determine that the object O protrudes compared to the standard shape when the rise time of the torque signal is earlier than the reference value, and determines that the object O is recessed compared to the standard shape when the rise time of the torque signal is later than the reference value.

The second estimation module 102B may also, for example, estimate the characteristic of the object O based on the difference between the rise time of the torque signal and the reference value. For example, when the difference in size is larger, the difference in the rise time is larger, and hence the second estimation module 102B may estimate the size of the object O based on the difference between the rise time of the torque signal and the reference value. Specifically, the second estimation module 102B may estimate that when the difference is larger, the difference from the standard size is larger, and when the difference is smaller, the difference from the standard size is smaller. For example, the second estimation module 102B may estimate that the size of the object O is abnormal when the difference between the rise time of the torque signal and the reference value is equal to or more than the threshold value.

Further, for example, the difference in rise time is larger when the difference in shape is larger, and therefore the second estimation module 102B may estimate the shape of the object O based on the difference between the rise time of the torque signal and the reference value. Specifically, the second estimation module 102B may estimate that when the difference is larger, the difference from the standard shape is larger, and when the difference is smaller, the difference from the standard shape is smaller. For example, the second estimation module 102B may estimate that the shape of the object O is abnormal when the difference between the rise time of the torque signal and the reference value is equal to or more than the threshold value.

[Third Estimation Module]

The third estimation module 102C is configured to estimate the characteristic of the object O based on a convergence timing of the torque signal. The convergence timing is a timing at which, after the rise time (or after the peak), the torque signal changes from a state in which the change in the torque signal is equal to or more than the threshold value to a state in which the change in the torque signal is less than the threshold value. Stated another way, the convergence timing is a timing at which the amount of decrease in the torque signal per unit time changes from the state in which the amount of decrease in the torque signal per unit time is equal to or more than the threshold value after the rise time (or after the peak) to the state in which the amount of decrease in the torque signal per unit time is less than the threshold value. The threshold value may be set to any value, and may be a fixed value or a variable value.

For example, the third estimation module 102C determines whether or not the convergence timing of the torque signal is earlier than the reference value, and estimates the characteristic of the object O based on the determination result. The reference value may be any timing determined in advance, and for example, is the convergence timing of the torque signal at a time when the robot hand 31 grips the standard object O. The reference value may be set manually by the user, or may be an average value of convergence timings of torque signals of objects O determined to be normal. In the examples of FIG. 7 and FIG. 8, the reference value is the convergence timing $t_{13}$ of the torque signal TS1. The third estimation module 102C determines whether or not the convergence timing of the torque signal is earlier than a standard timing.

For example, when the object O is larger than the standard size, the robot hand 31 touches the object O earlier than expected and gripping is also completed earlier. Therefore, as shown by the torque signal TS3 of FIG. 7, a convergence timing $t_{33}$ is earlier than the signal TS1. On the other hand, when the object O is smaller than the standard size, the robot hand 31 touches the object O later than expected and gripping is also completed later. Therefore, as shown by the torque signal TS4, a convergence timing $t_{43}$ is later than the torque signal TS1.

For this reason, the third estimation module 102C may determine whether or not the convergence timing of the torque signal is earlier than the reference value, and estimate the size of the object O based on the determination result. Specifically, the third estimation module 102C may determine that the object O is larger than standard when the convergence timing of the torque signal is earlier than the reference value, and determines that the object O is smaller than standard when the convergence timing of the torque signal is later than the reference value.

As another example, when the shape of the object O protrudes compared to a standard shape, the robot hand 31 touches the object O earlier than expected, and also completes the gripping earlier. Hence, the convergence timing $t_{33}$ is earlier than the torque signal TS1, as shown by the torque signal TS3. On the other hand, when the object O is recessed compared to the standard size, the robot hand 31 touches the object O later than expected, and also completes the gripping later. Thus, the convergence timing $t_{43}$ is later than the torque signal TS1, as shown by the torque signal TS4.

For this reason, the third estimation module 102C may determine whether or not the convergence timing of the torque signal is earlier than the reference value, and estimate the shape of the object O based on the determination result. Specifically, the third estimation module 102C may determine that the object O protrudes compared to the standard shape when the convergence timing of the torque signal is earlier than the reference value, and determines that the object O is recessed compared to the standard shape when the convergence timing of the torque signal is later than the reference value.

For example, when the hardness of the object O is more than a standard hardness, the robot hand 31 completes the gripping of the object O earlier than expected. Therefore, as shown by the torque signal TS3, the convergence timing $t_{33}$ is earlier than the torque signal TS1. On the other hand, when the hardness of the object O is less than the standard hardness, the robot hand 31 completes the gripping of the object O later than expected. Therefore, as shown by the torque signal TS4, the convergence timing $t_{43}$ is later than the torque signal TS1.

For this reason, the third estimation module 102C may determine whether or not the convergence timing of the torque signal is earlier than the reference value, and estimate the hardness of the object O based on the determination result. Specifically, the third estimation module 102C may determine that the object O is harder than the standard hardness when the convergence timing of the torque signal is earlier than the reference value, and determine that the object O is softer than the standard hardness when the convergence timing of the torque signal is later than the reference value.

The third estimation module 102C may also, for example, estimate the characteristic of the object O based on the difference between the convergence timing of the torque signal and the reference value. For example, when the difference in size is larger, the difference in the convergence timing is larger, and hence the third estimation module 102C may estimate the size of the object O based on the difference between the convergence timing of the torque signal and the reference value. Specifically, the third estimation module 102C may estimate that when the difference is larger, the difference from the standard size is larger, and when the difference is smaller, the difference from the standard size is smaller. For example, the third estimation module 102C may estimate that the size of the object O is abnormal when the difference between the convergence timing of the torque signal and the reference value is equal to or more than the threshold value.

Further, when the difference in the shape is larger, the difference in the convergence timing is larger, and hence the third estimation module 102C may estimate the shape of the object O based on the difference between the convergence timing of the torque signal and the reference value. Specifically, the third estimation module 102C may estimate that when the difference is larger, the difference from the standard shape is larger, and when the difference is smaller, the difference from the standard shape is smaller. For example, the third estimation module 102C may estimate that the shape of the object O is abnormal when the difference between the convergence timing of the torque signal and the reference value is equal to or more than the threshold value.

Further, when the difference in the hardness is larger, the difference in the convergence timing is larger, and hence the third estimation module 102C may estimate the hardness of the object O based on the difference between the convergence timing of the torque signal and the reference value. Specifically, the third estimation module 102C may estimate that when the difference is larger, the difference from the standard hardness is larger, and when the difference is smaller, the difference from the standard hardness is smaller. For example, the third estimation module 102C may estimate that the hardness of the object O is abnormal when the difference between the convergence timing of the torque signal and the reference value is equal to or more than the threshold value.

[Fourth Estimation Module]

The fourth estimation module 102D is configured to estimate the characteristic of the object O based on the peak value of the torque signal. The peak value is the maximum value of the torque signal in the acquisition period. Specifically, the peak value is the maximum value of the torque signal from when the robot hand 31 touches the object O until the robot hand 31 releases the object O. The fourth estimation module 102D sets the highest value of the torque signal changing over time as the peak value.

For example, the fourth estimation module 102D determines whether or not the peak value of the torque signal is higher than a reference value, and estimates the characteristic of the object O based on the determination result. The reference value may be any value determined in advance, and for example, is the peak value at a time when the robot hand 31 grips the standard object O. The reference value may be set manually by the user, or may be an average value of the peak values of torque signals of objects O determined to be normal. In the examples of FIG. 7 and FIG. 8, the reference value is the peak value $T_{11}$ of the torque signal TS1. The fourth estimation module 102D determines whether the peak value of the torque signal is higher or lower than a standard peak value.

For example, when the object O is larger than the standard size, the repelling force acting against the robot hand 31 from the object O increases when the hand tries to close to a predetermined position. Therefore, as shown by the torque signal TS3, a peak value $T_{31}$ is higher than the torque signal TS1. On the other hand, when the object O is smaller than the standard size, the repelling force acting against the robot hand 31 from the object O decreases when the hand tries to close to a predetermined position. Therefore, as shown by the torque signal TS4, a peak value $T_{41}$ is lower than the torque signal TS1.

For this reason, the fourth estimation module 102D may determine whether or not the peak value of the torque signal is higher than the reference value, and estimate the size of the object O based on the determination result. Specifically, the fourth estimation module 102D may determine that the object O is larger than standard when the peak value of the torque signal is higher than the reference value, and determine that the object O is smaller than standard when the peak value of the torque signal is lower than the reference value.

For example, when the shape of the object O protrudes compared to the standard shape, the repelling force acting against the robot hand 31 from the object O increases when the hand tries to close to a predetermined position. Therefore, as shown by the torque signal TS3, the peak value $T_{31}$ is higher than the torque signal TS1. On the other hand, when the object O is recessed compared to the standard shape, the repelling force acting against the robot hand 31 from the object O decreases when the hand tries to close to a predetermined position. Therefore, as shown by the torque signal TS4, the peak value $T_{41}$ is lower than the torque signal TS1.

For this reason, the fourth estimation module 102D may determine whether or not the peak value of the torque signal is higher than the reference value, and estimate the shape of the object O based on the determination result. Specifically, the fourth estimation module 102D may determine that the object O protrudes compared to the standard shape when the peak value of the torque signal is higher than the reference value, and determine that the object O is recessed compared to the standard shape when the peak value of the torque signal is lower than the reference value.

For example, when the hardness of the object O is more than the standard hardness, the repelling force acting against the robot hand 31 from the object O increases when the hand tries to close to a predetermined position. Therefore, as shown by the torque signal TS3, the peak value $T_{31}$ is higher than the torque signal TS1. On the other hand, when the hardness of the object O is less than the standard hardness, the repelling force acting against the robot hand 31 from the object O decreases when the hand tries to close to a predetermined position. Therefore, as shown by the torque signal TS4, the peak value $T_{41}$ is lower than the torque signal TS1.

For this reason, the fourth estimation module 102D may determine whether or not the peak value of the torque signal is higher than the reference value, and estimate the hardness of the object O based on the determination result. Specifically, the fourth estimation module 102D may determine that the object O is harder than the standard hardness when the peak value of the torque signal is higher than the reference value, and determine that the object O is softer than the standard hardness when the peak value of the torque signal is lower than the reference value. The fourth estimation module 102D may also, for example, estimate the characteristic of the object O based on the difference between the peak value of the torque signal and the reference value. For example, when the difference in size is larger, the difference in the peak value is larger, and hence the fourth estimation module 102D may estimate the size of the object O based on the difference between the peak value of the torque signal and the reference value. Specifically, the fourth estimation module 102D may estimate that when the difference is larger, the difference from the standard size is larger, and when the difference is smaller, the difference from the standard size is smaller.

For example, when the difference in shape is larger, the difference in the peak value is larger, and hence the fourth estimation module 102D may estimate the shape of the object O based on the difference between the peak value of the torque signal and the reference value. Specifically, the fourth estimation module 102D may estimate that when the difference is larger, the difference from the standard shape is larger, and when the difference is smaller, the difference from the standard shape is smaller.

For example, when the difference in hardness is larger, the difference in the peak value is larger, and hence the fourth estimation module 102D may estimate the hardness of the object O based on the difference between the peak value of the torque signal and the reference value. Specifically, the fourth estimation module 102D may estimate that when the difference is larger, the difference from the standard hardness is larger, and when the difference is smaller, the difference from the standard hardness is smaller.

[Fifth Estimation Module]

The fifth estimation module 102E is configured to estimate the characteristic of the object O based on the convergence value at a time when the torque signal converges. The convergence value is the value of the torque signal at a time when the convergence timing arrives. Stated another way, the convergence value is the value at a time when the change amount of the torque signal becomes less than the threshold value after the rise time (after the peak). The threshold value can be set to any value, and may be a fixed value or a variable value.

For example, the fifth estimation module 102E determines whether or not the convergence value of the torque signal is higher than a reference value, and estimates the characteristic of the object O based on the determination result. The reference value may be any value determined in advance, and for example, is the convergence value at a time when the robot hand 31 grips the standard object O. The reference value may be set manually by the user, or may be an average value of the convergence values of past torque signals. In the examples of FIG. 7 and FIG. 8, the reference value is the convergence value $T_{12}$ of the torque signal TS1. The fifth estimation module 102E determines whether or not the convergence value of the torque signal is higher or lower than a standard convergence value.

For example, when the object O is larger than the standard size, the repelling force from the object O against the robot hand 31 increases when the robot hand 31 tries to close the hand to a predetermined position, and therefore as shown by the torque signal TS3, the convergence value $T_{32}$ is higher than the torque signal TS1. On the other hand, when the object O is smaller than the standard size, the repelling force from the object O against the robot hand 31 decreases when the robot hand 31 tries to close the hand to a predetermined position, and therefore as shown by the torque signal TS4, the convergence value $T_{42}$ is lower than the torque signal TS1.

For this reason, the fifth estimation module 102E may determine whether or not the convergence value of the torque signal is higher than the reference value, and estimate the size of the object O based on the determination result. Specifically, the fifth estimation module 102E may determine that the object O is larger than standard when the convergence value of the torque signal is higher than the reference value, and determine that the object O is smaller than standard when the convergence value of the torque signal is lower than the reference value.

For example, when the shape of the object O protrudes compared to the standard shape, the repelling force from the object O against the robot hand 31 increases when the robot hand 31 tries to close the hand to a predetermined position, and therefore as shown by the torque signal TS3, the convergence value $T_{32}$ is higher than the torque signal TS1. On the other hand, when the object O is recessed compared to the standard shape, the repelling force from the object O against the robot hand 31 decreases when the robot hand 31 tries to close the hand to a predetermined position, and therefore as shown by the torque signal TS4, the convergence value $T_{42}$ is lower than the torque signal TS1.

For this reason, the fifth estimation module 102E may determine whether or not the convergence value of the torque signal is higher than the reference value, and estimate the shape of the object O based on the determination result. Specifically, the fifth estimation module 102E may determine that the object O protrudes compared to the standard shape when the convergence value of the torque signal is higher than the reference value, and determine that the object O is recessed compared to the standard shape when the convergence value of the torque signal is lower than the reference value.

For example, when the hardness of the object O is more than the standard hardness, the repelling force from the object O against the robot hand 31 increases when the robot hand 31 tries to close the hand to a predetermined position, and therefore as shown by the torque signal TS3, the convergence value $T_{32}$ is higher than the torque signal TS1. On the other hand, when the hardness of the object O is less than the standard hardness, the repelling force from the object O against the robot hand 31 decreases when the robot hand 31 tries to close the hand to a predetermined position, and therefore as shown by the torque signal TS4, the convergence value $T_{42}$ is lower than the torque signal TS1.

For this reason, the fifth estimation module 102E may determine whether or not the convergence value of the torque signal is higher than the reference value, and estimate the hardness of the object O based on the determination result. Specifically, the fifth estimation module 102E may determine that the object O is harder than the standard hardness when the convergence value of the torque signal is higher than the reference value, and determine that the object O is softer than the standard hardness when the convergence value of the torque signal is lower than the reference value.

The fifth estimation module 102E may also, for example, estimate the characteristic of the object O based on the difference between the convergence value of the torque signal and the reference value. For example, when the difference in the size is larger, the difference in convergence value is larger, and hence the fifth estimation module 102E may estimate the size of the object O based on the difference between the convergence value of the torque signal and the reference value. Specifically, the fifth estimation module 102E may estimate that when the difference is larger, the difference from the standard size is larger, and when the difference is smaller, the difference from the standard size is smaller.

For example, when the difference in the shape is larger, the difference in convergence value is larger, and hence the fifth estimation module 102E may estimate the shape of the object O based on the difference between the convergence value of the torque signal and the reference value. Specifically, the fifth estimation module 102E may estimate that when the difference is larger, the difference from the standard shape is larger, and when the difference is smaller, the difference from the standard shape is smaller.

For example, when the difference in the hardness is larger, the difference in convergence value is larger, and hence the fifth estimation module 102E may estimate the hardness of the object O based on the difference between the convergence value of the torque signal and the reference value. Specifically, the fifth estimation module 102E may estimate that when the difference is larger, the difference from the standard hardness is larger, and when the difference is smaller, the difference from the standard hardness is smaller.

In the examples described above, there are described cases in which at least one of the size, shape, or hardness is estimated as the characteristic of the object O, but another characteristic may be estimated. For example, the force (brittleness) of the object O may be estimated based on the torque signal. When the force of the object O is less than a standard force, the robot hand 31 may break the object O when the object O is gripped. In this case, the torque signal changes suddenly, and thus when there is a sudden change in the torque signal, it may be estimated that the force of the object O is insufficient (object O is weaker than standard).

In addition, in the examples described above, there are described cases in which the characteristic of the object O is estimated based on a torque signal, but the characteristic of the object O may be estimated based on another physical quantity. For example, the estimation module 102 may estimate the characteristic of the object O based on a force signal detected by the force sensor of the sensor unit 32. For example, when the object O is larger than the standard size, similarly to the rise time of the torque sensor, the robot hand 31 touches the object O earlier than expected, and hence the rise time of the force signal is earlier than standard. Therefore, the estimation module 102 may estimate the characteristic of the object O based on the rise time of the force signal. Similarly, the estimation module 102 may estimate the characteristic of the object O based on at least one of the convergence timing, the peak value, or the convergence value of the force signal.

As another example, the estimation module 102 may estimate the characteristic of the object O based on an encoder signal detected by the motor encoder of the sensor unit 32. For example, when the object O is larger than the standard size, the robot hand 31 touches the object O earlier than expected, and hence the timing at which the rotation amount or movement amount of the motor drops is earlier than standard. For this reason, the estimation module 102 may estimate the characteristic of the object O based on the timing at which the rotation amount or movement amount of the motor drops. Similarly, the estimation module 102 may estimate the characteristic of the object O based on the timing at which the rotation or movement of the motor stops, for example.

4. Processing to be Performed in Characteristic Estimation System

Figure 9:
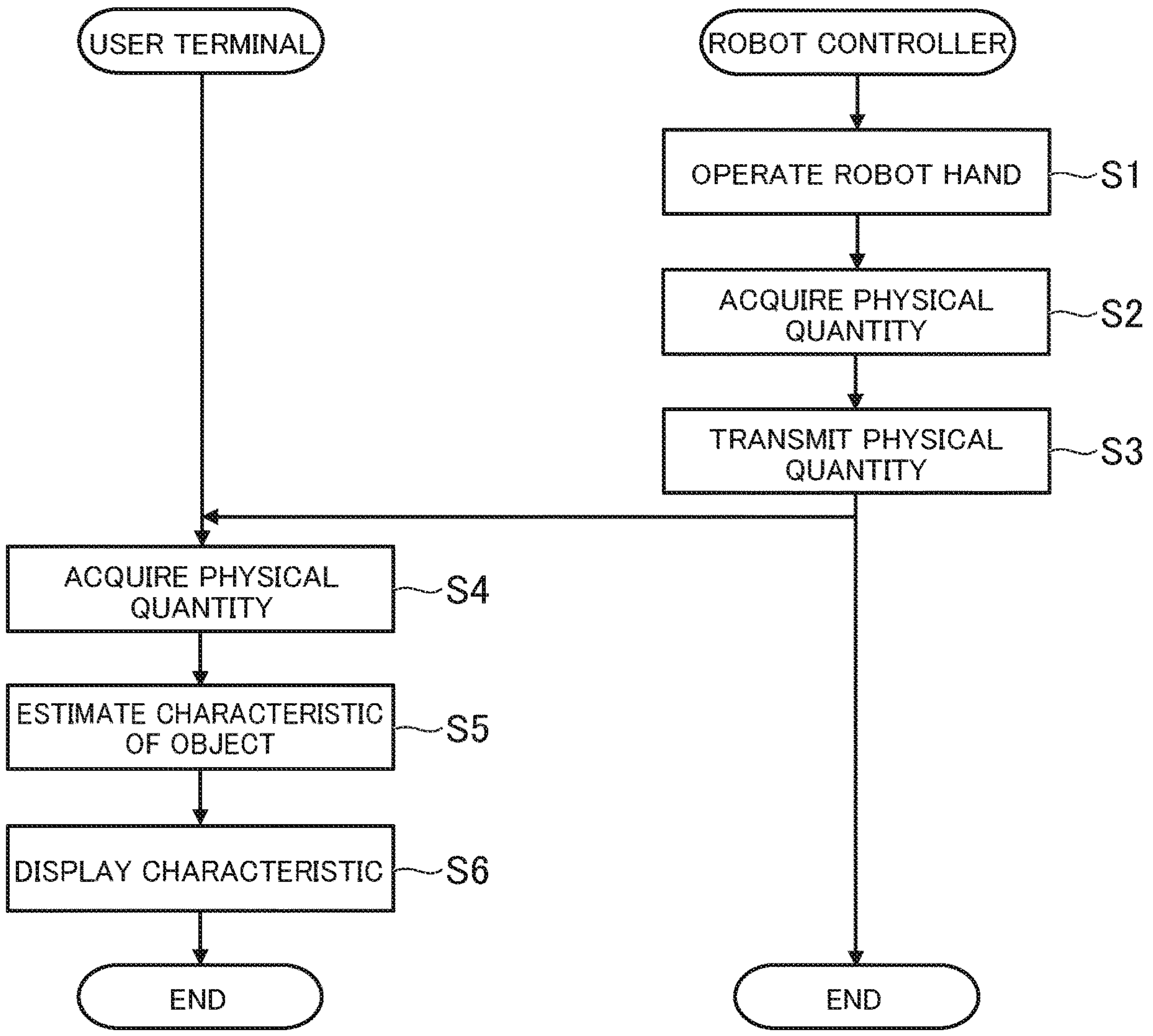
FIG. 9 is a flowchart for illustrating processing to be executed in the characteristic estimation system.

FIG. 9 is a flowchart for illustrating processing to be executed in the characteristic estimation system 1. The processing illustrated in FIG. 9 is executed in the user terminal 10 by the CPU 11 operating in accordance with programs stored in the storage 12, and executed in the robot controller 20 by the CPU 21 operating in accordance with programs stored in the storage 22. The processing illustrated in FIG. 9 is an example of processing to be executed by the functional blocks illustrated in FIG. 3, and is executed each time a cycle for manufacturing the object O arrives, for example.

As illustrated in FIG. 9, first, in the robot controller 20, the CPU 21 operates the robot hand 31 based on the operation information stored in the storage 22 (Step S1). In Step S1, the CPU 21 controls the output voltage to the motor in the robot hand 31 such that the robot hand 31 opens and closes at the timing and force indicated by the operation information.

The CPU 21 acquires a physical quantity detected by the sensor unit 32 (Step S2). In Step S2, the CPU 21 acquires the torque signal from the torque sensor of the sensor unit 32. The CPU 21 may also acquire, for example, the force signal from the force sensor of the sensor unit 32 or the encoder signal from the motor encoder of the sensor unit 32.

The CPU 21 transmits the physical quantity acquired in Step S2 to the user terminal 10 (Step S3). In Step S3, the CPU 21 transmits to the user terminal 10 a change over time in the physical quantity based on the physical quantity repeatedly acquired in the cycle.

In the user terminal 10, the CPU 11 acquires from the robot controller 20 the physical quantity detected by the sensor unit 32 (Step S4). In Step S4, the CPU 11 records the acquired physical quantity in the database DB in association with the current date and time.

The CPU 11 estimates the characteristic of the object O based on the physical quantity acquired in Step S4 (Step S5). As described above, when the torque signal is the physical quantity, in Step S5, the CPU 11 estimates at least one of the size, shape, or hardness of the object O based on at least one of the torque signal, rise timing, convergence timing, peak value, or convergence value in past cycles.

The CPU 11 displays the characteristic of the object O estimated in Step S5 on the display 15 (Step S6). In Step S6, the CPU 11 may display on the display 15 the presence/absence of an abnormality in the object O, or may display on the display 15 estimated information on at least one of the estimated size, shape, or hardness of the object O. In this example, the estimation result of the characteristic is displayed on the display 15, but the CPU 11 may transmit the estimation result to a computer of a person in charge of product inspection or may record the estimation result in the storage 12 without particularly displaying the estimation result. As another example, the CPU 11 may output an alarm by using sound, light, or the like when an abnormality has occurred in the object O.

In the characteristic estimation system. 1 described above, a robot hand 31 configured to grip the object O operates based on operation information, and a characteristic of the object O can be estimated based on a physical quantity at a time when the robot hand 31 grips the object O. For example, when the object O does not have a desired hardness, the physical quantity at a time when the robot hand 31 grips the object O does not show a predetermined waveform, and hence the hardness of the object O can be estimated. As another example, when the object O does not have a desired size or shape, the physical quantity at a time when the robot hand 31 grips the object O does not show a predetermined waveform, and hence the size or shape of the object O can be estimated. As a result, it is possible to reduce the amount of work and effort required for inspection and to improve the quality of the product.

Further, the characteristic of the object O can be estimated more accurately by estimating the characteristic of the object O based on a change in the torque signal acquired in each manufacturing cycle of the object O, for example, by estimating whether or not the torque signal has deviated from a normal state.

In addition, the characteristic of the object O can be estimated more accurately by estimating the characteristic of the object O based on the rise time of the torque signal.

In addition, the characteristic of the object O can be estimated more accurately by estimating the characteristic of the object O based on the convergence timing of the torque signal.

In addition, the characteristic of the object O can be estimated more accurately by estimating the characteristic of the object O based on the peak value of the torque signal.

In addition, the characteristic of the object O can be estimated more accurately by estimating the characteristic of the object O based on the convergence value of the torque signal.

5. Modification Examples

The present invention is not limited to the embodiment described above, and can be modified suitably without departing from the spirit of the present invention.

Figure 10:
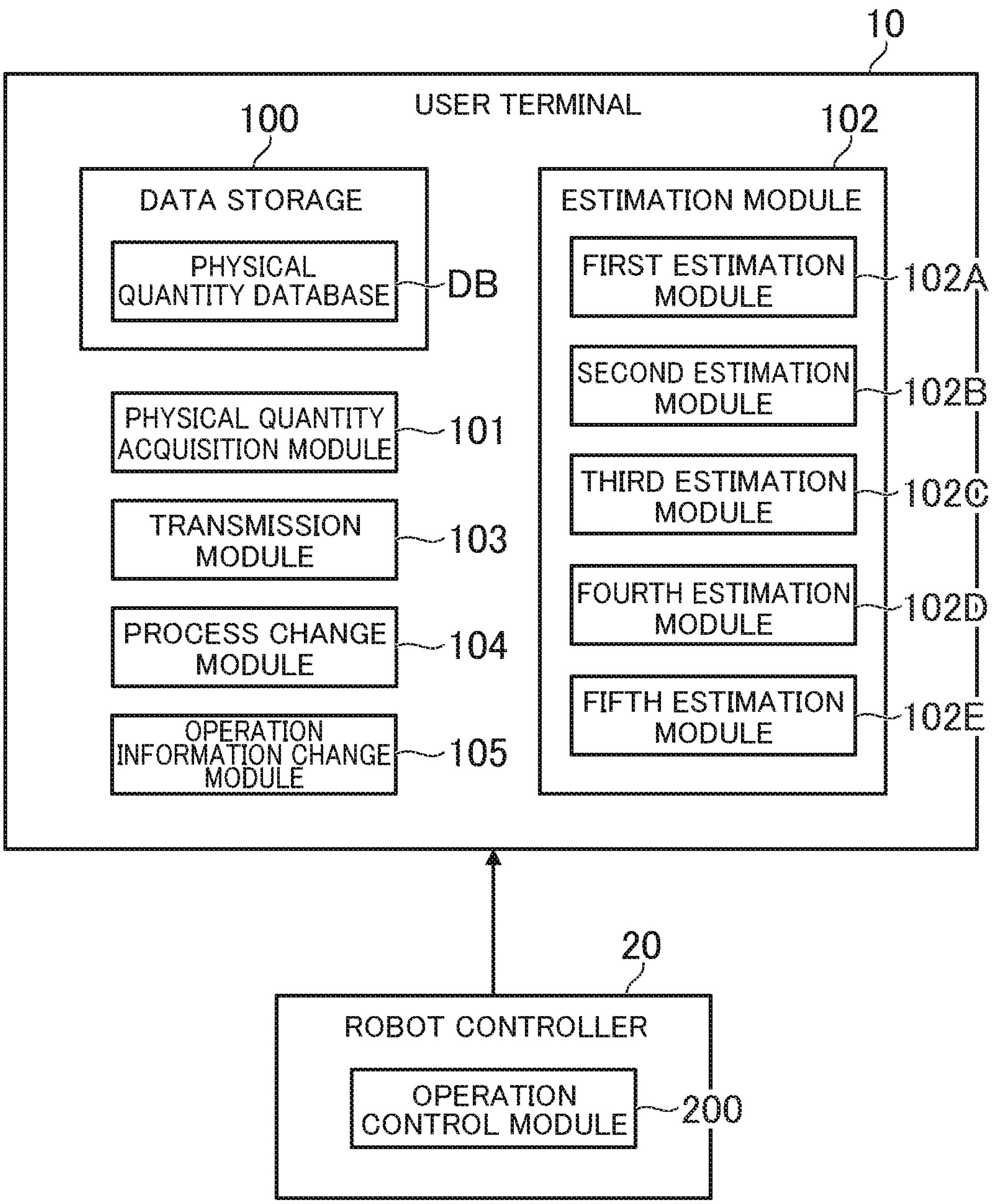
FIG. 10 is a functional block diagram in a modification example of the present invention.

FIG. 10 is a functional block diagram in a modification example of the present invention. As illustrated in FIG. 10, in the modification example described below, a transmission module 103, a process change module 104, and an operation information change module 105 are implemented. Each of those functions is mainly implemented by the CPU 11.

(1) For example, the characteristic estimation system 1 may be configured to issue a request to an external system connected to the network N to manage and analyze a physical quantity detected by the sensor unit 32. In this case, the characteristic estimation system 1 may transmit the data including the physical quantity to the external system each time the physical quantity is acquired, but the amount of data to be managed or analyzed by the external system may be reduced by transmitting the data only at a specific time.

In the characteristic estimation system 1 of this modification example, the transmission module 103 is implemented. The transmission module 103 is configured to transmit, based on the characteristic estimated by the estimation module 102, data including the physical quantity to a computer configured to analyze the physical quantity.

In this modification example, there is described a case in which the computer that analyzes the physical quantity is included in the external system, but the computer may be included in the characteristic estimation system 1. For example, the computer is a server computer, a personal computer, a cellular phone, or a mobile terminal. The computer stores an application for collecting and accumulating data in which the physical quantity is stored and an application for analyzing the physical quantity. The computer executes various types of processing based on those applications.

The data in which the physical quantity is stored may be in any data format. For example, the data may be an individual record in the database DB, or a plurality of records may be transmitted together.

The transmission module 103 is configured to determine whether or not the characteristic estimated by the estimation module 102 is a predetermined characteristic. The transmission module 103 transmits the data including the physical quantity to the computer when the estimated characteristic is the predetermined characteristic, and does not transmit the data including the physical quantity to the computer when the estimated characteristic is not the predetermined characteristic. The predetermined characteristic is a condition for determining whether or not to transmit data in which the physical quantity is stored, and any condition can be applied. For example, estimation that an abnormality is to occur in the object O, or the fact that at least one of the size, shape, or hardness of the object O is different from standard, may correspond to the predetermined characteristic.

In the first modification example, it is possible to transmit only the data required for analysis to the computer that is to analyze the physical quantity by transmitting the data including the physical quantity to the computer based on the estimated characteristic of the object O. For this reason, it is possible to prevent data that is not required from being transmitted, reduce memory consumption of the computer, and reduce the communication amount of the network. In addition, the characteristic estimation system 1 does not transmit data constantly, and therefore the processing load on the characteristic estimation system can be reduced.

(2) In the embodiment, there are described cases in which the estimation result of the estimation module 102 is displayed on the display 15 or notified to the person in charge of inspection. However, the method of utilizing the estimation result of the estimation module 102 is not limited to the examples described in the embodiment. For example, in a case in which an abnormality is estimated when the robot hand 31 grips the object O, there may be a problem in a previous process. For this reason, the estimation result of the estimation module 102 may be used in a previous process.

In the characteristic estimation system 1 of this modification example, a process change module 104 is implemented. The process change module 104 is configured to change, based on the characteristic estimated by the estimation module 102, a process before the process in which the robot hand 31 grips the object O. In the embodiment, there is implemented a process in which the robot hand 31 grips the object O after the raw material production process and the molding process, and therefore the process change module 104 changes at least one of the raw material production process or the molding process.

For example, the process change module 104 determines whether or not the characteristic estimated by the estimation module 102 is a predetermined characteristic. The process change module 104 changes the previous process when the estimated characteristic is the predetermined characteristic, and does not change the previous process when the estimated characteristic is not the predetermined characteristic. The predetermined characteristic is a condition for determining whether or not to change the previous process, and any condition can be applied. For example, estimation that an abnormality is to occur in the object O, or the fact that at least one of the size, shape, or hardness of the object O is different from standard, may correspond to the predetermined characteristic.

For example, the process change module 104 changes a parameter such as the blend ratio of the raw material in the raw material production process, the amount of rotation/vibration of the apparatus, the temperature of hot air, or the drying time. As another example, the process change module 104 changes the molding method in the molding process, or changes a parameter such as pressure or pressing time during molding. The change performed by the process change module 104 is not limited to those examples, and any change may be performed as long as a process suitable for the object O is changed.

In the second modification example, the characteristic of the object O can be changed by changing the process before the process in which the robot hand 31 grips the object O based on the estimated characteristic of the object O. Specifically, the estimated characteristic of the object O can be fed back into the previous process. For example, in the previous process, in the case of blending the raw materials or molding the object O, the characteristic of the object O can be changed by changing those processes.

(3) For example, in the second modification example, as a method of utilizing the estimation result of the estimation module 102, there is described a case in which the process before the process in which the robot hand 31 grips the object O is changed. However, there is also a possibility that the problem is not in the previous process, but is in the process in which the robot hand 31 grips the object O. For this reason, the estimation result of the estimation module 102 may be utilized in the process in which the robot hand 31 grips the object O.

The operation information change module 105 is configured to change the operation information based on the characteristics estimated by the estimation module 102. For example, the operation information change module 105 determines whether or not the characteristic estimated by the estimation module 102 is a predetermined characteristic. The operation information change module 105 changes the operation information when the estimated characteristic is the predetermined characteristic, and does not change the operation information when the estimated characteristic is not the predetermined characteristic. The predetermined characteristic is a condition for determining whether or not to change the operation information, and any condition can be applied. For example, estimation that an abnormality is to occur in the object O, or the fact that at least one of the size, shape, or hardness of the object O is different from standard, may correspond to the predetermined characteristic.

For example, the operation information change module 105 changes the position of the robot hand 31 when the estimated characteristic is the predetermined characteristic. As another example, the operation information change module 105 changes the timing for opening and closing the robot hand 31 when the estimated characteristic is the predetermined characteristic. For example, when it is estimated that the size of the object O is large, when it is estimated that the shape of the object O is protruding, or when it is estimated that the object O is hard, there is a possibility that the robot hand 31 closed too early, and hence the operation information change module 105 delays the timing of closing the robot hand 31.

As another example, the operation information change module 105 changes the force of opening and closing the robot hand 31 when the estimated characteristic is the predetermined characteristic. For example, when it is estimated that the size of the object O is large, when it is estimated that the shape of the object O is protruding, or when it is estimated that the object O is hard, there is a possibility that the robot hand 31 closed with too much force, and hence the operation information change module 105 decreases the force of closing the robot hand 31.

In the third modification example, the process in which the robot hand 31 grips the object O can be changed by changing the operation information at a time when the robot hand 31 grips the object O based on the estimated characteristic of the object O. The object O can be gripped by the robot hand 31 in a stable state corresponding to the characteristic of the object O.

(4) For example, the modification examples described above may be combined.

For example, the sensor included in the sensor unit 32 may be any sensor, and is not limited to a torque sensor, a force sensor, and a motor encoder. For example, a temperature sensor may be included in the sensor unit 32, a temperature detected by the temperature sensor may correspond to the physical quantity, and the characteristic of the object O may be estimated based on the temperature. As another example, a magnetic sensor may be included in the sensor unit 32, magnetism detected by the magnetic sensor may correspond to the physical quantity, and the characteristic of the object O may be estimated based on magnetism.

Processed food has been described above as an example of the product, but the characteristic estimation system 1 can be applied to any product. For example, the characteristic estimation system 1 may estimate the characteristic of the object O in a process of manufacturing or working a material. In this case, the object O may be a material that is a final product, or may be a material that has been processed to produce a food. As another example, the characteristic estimation system 1 may estimate the characteristic of the object O in a manufacturing process of a vehicle such as a car or a motorcycle. In this case, the object O is an individual part forming the vehicle. In addition, for example, the characteristic estimation system. 1 can be freely applied in situations such as manufacturing of furniture or building components, or manufacturing of semiconductor substrates.

An industrial robot has been described above as an example of the robot 30, but various types of robots can be applied as the robot 30, such as a service robot, a home robot, or a medical robot. For example, the characteristic of a product or the like gripped by a service robot may be estimated based on the physical quantity detected by the sensor unit 32. As another example, the characteristic of tableware or the like gripped by a home robot may be estimated based on the physical quantity detected by the sensor unit 32. As another example, the characteristic of medical equipment or the like gripped by a medical robot may be estimated based on the physical quantity detected by the sensor unit 32.

There has been described cases in which each function is implemented by the user terminal 10, but each function may be distributed among a plurality of computers. In addition, for example, each function may be implemented by a server computer.

The characteristic estimation system 1 may also use, for example, machine learning (for example, Bayesian network, support vector machine, or deep learning) when estimating the characteristic of the object O. For example, the characteristic estimation system 1 may use machine learning when determining whether or not there is an abnormality in the object O. In this case, the characteristic estimation system 1 causes a learning device to learn based on teacher data including a physical quantity measured when an abnormality has occurred in the object O and a physical quantity measured when the abnormality has not occurred in the object O (that is, when normal). When the characteristic estimation system 1 inputs the physical quantity measured when the robot hand 31 grips the object O into a learning device that has finished learning, the learning device determines whether to classify the input physical quantity as being abnormal or normal (that is, assign a label to input physical quantity indicating which of abnormal or normal the physical quantity is), and outputs an analysis result. Various types of classification learning device methods are applicable to the determination itself. For example, when a convolutional neural network is used, the input physical quantity is converted into a feature amount, and classification is performed based on the feature amount. Further, there exists a plurality of types of abnormalities, such as a hardness abnormality and a size abnormality, and hence a physical quantity for each type of abnormality may be stored in the teacher data, and the learning device may classify the type of abnormality that has occurred based on the input physical quantities. In addition, for example, when a recurrent neural network is used, the learning device may classify the type of abnormality that has occurred by dividing a physical quantity measured over a certain period when the robot hand 31 grips the object O into a plurality of periods, and considering the physical quantity of each period in time series.

Further, the embodiment described above is given as a specific example, and is not to limit the invention disclosed herein to the very configuration and data storage examples of the specific example. A person skilled in the art may make various modifications to the disclosed embodiment with regard to, for example, the shapes and numbers of physical components, data structures, and execution orders of processing. It is to be understood that the technical scope of the invention disclosed herein encompasses such modifications. In other words, it should be understood by those skilled in the art that various modifications, combinations, sub-combinations and alterations may occur depending on design requirements and other factors insofar as they are within the scope of the appended claims or equivalents thereof.

What is claimed is:

1. A characteristic estimation system, comprising circuitry configured to:

cause a robot hand configured to grip an object to operate based on operation information defining an operation of the robot hand;

acquire a physical quantity that includes a torque signal at a time when the robot hand grips the object; and estimate a characteristic of the object based on a rise time of the torque signal, the characteristic being size, shape or hardness of the object, wherein the circuitry is configured to:

determine whether or not the rise time of the torque signal is earlier than a reference value, and determine that the object is larger than a standard when the rise time of the torque signal is earlier than the reference value and determine that the object is smaller than the standard when the rise time is the torque signal is later than the reference value, or determine that the object protrudes compared to a standard shape when the rise time of the torque signal is earlier than the reference value and determine that the object is recessed compared to the standard shape when the rise time of the torque signal is later than the reference value, and wherein the rise is a timing at which the torque signal changes from a state in which a change in the torque signal is less than a threshold value before the robot hand touches the object to a state in which the robot hand touches the object and the change in the torque signal is equal to or more than the threshold value.

2. The characteristic estimation system according to claim 1, wherein the circuitry is configured to conduct a process for transmitting data including the physical quantity to a computer configured to analyze the physical quantity, based on the estimated characteristic.

3. The characteristic estimation system according to claim 2, wherein the circuitry is configured to change, based on the estimated characteristic, a parameter of a first process that is executed before a second process of the robot hand gripping the object.

4. The characteristic estimation system according to claim 2, wherein the circuitry is configured to change the operation information based on the estimated characteristic.

5. The characteristic estimation system according to claim 2, wherein the object is manufactured in cycles, and wherein the circuitry is configured to estimate the characteristic of the object based on a change in the torque signal acquired in each manufacturing cycle of the object, the manufacturing cycle being a time period from start of manufacturing the object to end of manufacturing the object.

6. The characteristic estimation system according to claim 1, wherein the circuitry is configured to change, based on the estimated characteristic, a parameter of a first process that is executed before a second process of the robot hand gripping the object, wherein the second process is executed by a robot controller that controls the robot, wherein the first process is executed by an industrial machine that is different from the robot controller and the robot, and wherein the parameter relates an action of the industrial machine.

7. The characteristic estimation system according to claim 6, wherein the circuitry is configured to change the operation information based on the estimated characteristic.

8. The characteristic estimation system according to claim 6, wherein the object is manufactured in cycles, and wherein the circuitry is configured to estimate the characteristic of the object based on a change in the torque signal acquired in each manufacturing cycle of the object, the manufacturing cycle being a time period from start of manufacturing the object to end of manufacturing the object.

9. The characteristic estimation system according to claim 1, wherein the circuitry is configured to change the operation information based on the estimated characteristic.

10. The characteristic estimation system according to claim 9, wherein the object is manufactured in cycles, and wherein the circuitry is configured to estimate the characteristic of the object based on a change in the torque signal acquired in each manufacturing cycle of the object, the manufacturing cycle being a time period from start of manufacturing the object to end of manufacturing the object.

11. The characteristic estimation system according to claim 1, wherein the object is manufactured in cycles, and wherein the circuitry is configured to estimate the characteristic of the object based on a change in the torque signal acquired in each manufacturing cycle of the object, the manufacturing cycle being a time period from start of manufacturing the object to end of manufacturing the object.

12. The characteristic estimation system according to claim 1, wherein the circuitry is configured to estimate the characteristic of the object based on a convergence timing of the torque signal.

13. The characteristic estimation system according to claim 1, wherein the circuitry is configured to estimate the characteristic of the object based on a peak value of the torque signal.

14. The characteristic estimation system according to claim 1, wherein the circuitry is configured to estimate the characteristic of the object based on a convergence value obtained when the torque signal converges.

15. A characteristic estimation method, comprising:

causing a robot hand configured to grip an object to operate based on operation information defining an operation of the robot hand;

acquiring a physical quantity that includes a torque signal at a time when the robot hand grips the object; and estimating a characteristic of the object based on a rise time of the torque signal, the characteristic being size, shape or hardness of the object, determining whether or not the rise time of the torque signal is earlier than a reference value, and determining that the object is larger than a standard when the rise time of the torque signal is earlier than the reference value and determining that the object is smaller than the standard when the rise time of the torque signal is later than the reference value, or determining that the object protrudes compared to a standard shape when the rise time of the torque signal is earlier than the reference value and determining that the object is recessed compared to the standard shape when the rise time of the torque signal is later than the reference value, and wherein the rise time is a timing at which the torque signal changes from a state in which a change in the torque signal is less than a threshold value before the robot hand touches the object to a state in which the robot hand touches the object and the change in the torque signal is equal to or more than the threshold value.

16. A non-transitory computer readable information storage medium storing a program for causing a computer to:

acquire a physical quantity that includes a torque signal at a time when a robot hand, which is configured to grip an object and to operate based on operation information defining an operation of the robot hand, grips the object; and estimate a characteristic of the object based on a rise time of the torque signal, the characteristic being size, shape or hardness of the object;

determine whether or not the rise time of the torque signal is earlier than a reference value, and determine that the object is larger than a standard when the rise time of the torque signal is earlier than the reference value and determine that the object is smaller than the standard when the rise time of the torque signal is later than the reference value, or determine that the object protrudes compared to a standard shape when the rise time of the torque signal is earlier than the reference value and determine that the object is recessed compared to the standard shape when the rise time of the torque signal is latter than the reference value, and wherein the rise time is a timing at which the torque signal changes from a state in which a change in the torque signal is less than a threshold value before the robot hand touches the object to a state in which the robot hand touches the object and the change in the torque signal is equal to or more than the threshold value.

* * * * *